E. O. SCHWEITZER.
POTENTIAL INDICATING AND MEASURING DEVICE.
APPLICATION FILED NOV. 12, 1908.
1,043,150.
Patented Nov. 5, 1912.
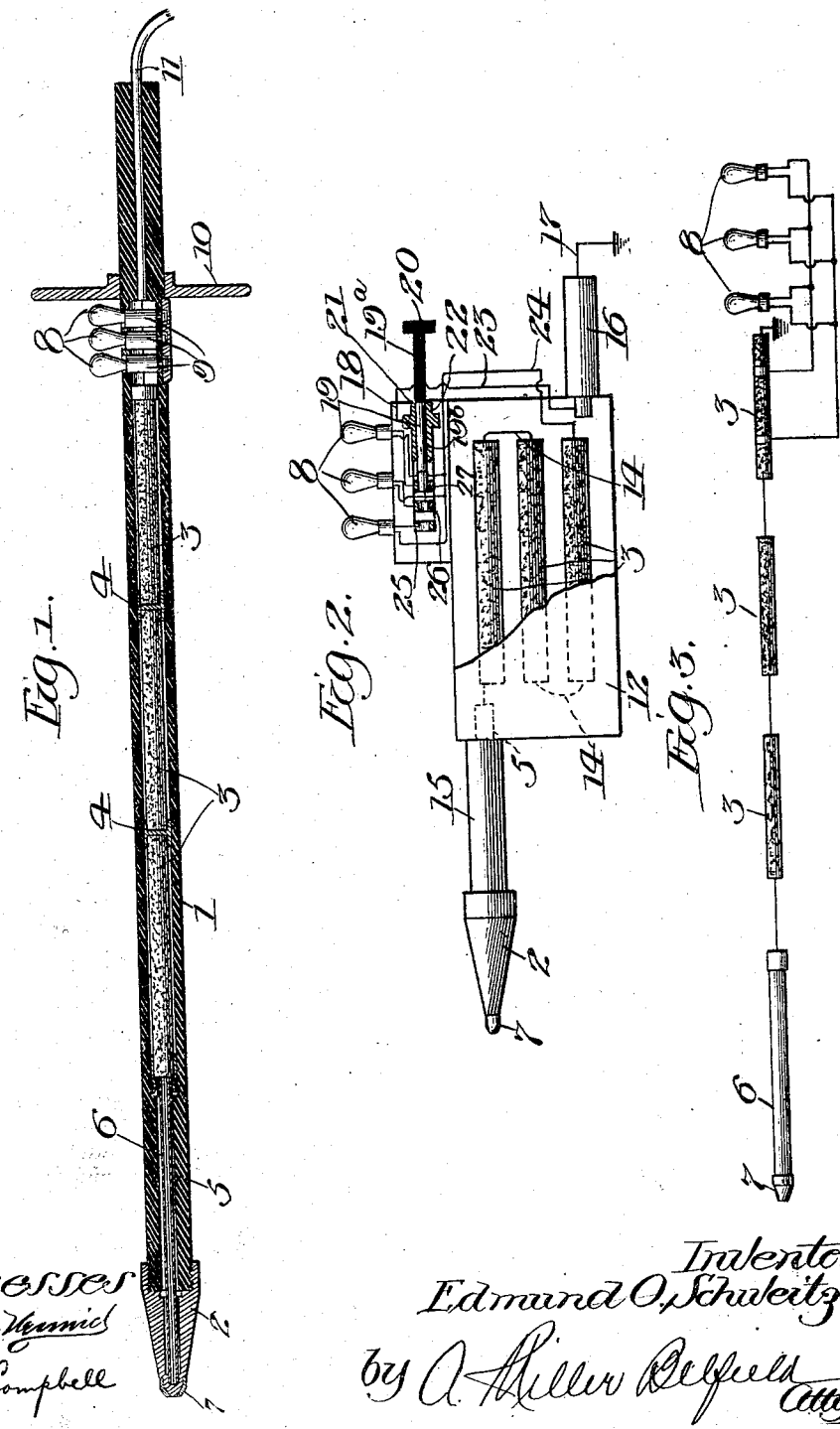
Inventor
Edmund O. Schweitzer

UNITED STATES PATENT OFFICE.

EDMUND O. SCHWEITZER, OF CHICAGO, ILLINOIS.

POTENTIAL INDICATING AND MEASURING DEVICE.

1,043,150.

Specification of Letters Patent. Patented Nov. 5, 1912.

Application filed November 12, 1908. Serial No. 462,216.

*To all whom it may concern:*

Be it known that I, EDMUND O. SCHWEITZER, a citizen of the United States, residing at Chicago, in the county of Cook and State of Illinois, have invented a certain new and useful Improvement in Potential Indicating and Measuring Devices, of which the following is a full, clear, concise, and exact description, reference being had to the accompanying drawings, forming a part of this specification.

My invention relates to potential indicating and measuring devices, and its principal object is to provide a simple, practical, inexpensive and efficient portable indicating and measuring device which can be used with equal facility for indicating and measuring both high and comparatively low potentials.

In the device herein shown for carrying out my invention I provide an indicating device, such as several incandescent lamps, although some other device, such as a voltmeter or ammeter, or the like, could be used, and I also provide a resistance, preferably one having a negative temperature coefficient, so that the current will pass through the resistance and then through the indicating device. In this way the device can be applied to a terminal whose potential, or lack of potential, it is desired to ascertain, and the device is connected to ground or the other side of the circuit, and when thus arranged, if the terminal is charged, the indicating device will be actuated,—as for example, if lamps are used the lamps will be lighted. This will indicate of course that the terminal is charged. If the lamps are not lighted, it will indicate that the terminal is not charged.

By using a resistance having a negative temperature coefficient, a high potential will immediately operate or actuate the indicating device, whereas a low potential will not actuate it, but will do so in a moderately short period of time, because of the reduction of the resistance as the current continues to flow through the resistance. Thus a high potential will be indicated by an immediate actuation—as for example an immediate lighting of the lamps, in case such are used, upon putting the device into use, and a low potential will cause the lights to become lighted a few seconds or minutes after the device is applied to the terminal.

I have found the device to operate successfully upon a range of potentials running from several hundreds up to several thousand volts.

As a preferred arrangement when lamps are used. I also employ a switch by which one or more of the lamps can be thrown into circuit. For example, I may use three lamps and arrange the switch so that either one or two, or all three, may be included in the circuit as desired.

In the operation of this device it has been found convenient to use three resistances which have approximately 18000 ohms resistance, and three lamps, preferably each having about 220 ohms resistance. Considering the voltage of the circuit and the 18000 ohms resistance it can be readily seen that if approximately one-half ampere flows, which is sufficient to light one lamp to brilliancy, the voltage of the circuit is 9000 volts. Now if for instance two lamps are lighted to brilliancy, the voltage of the circuit would be 18000 volts. The manipulators of the device can, by knowing the approximate current which it takes to light one or more lamps to varying degrees of brilliancy, estimate within twenty per cent. by the indications of the device, what is the voltage of the circuit under test, and this is sufficient for the purposes for which this device is intended. Thus by operating the switch so as to cause one or more of the lamps to be lighted to full candlepower for example, and knowing the resistance of the device, the potential can be substantially calculated.

In the accompanying drawings Figure 1 is a longitudinal section of a potential indicating device embodying my present invention; Fig. 2 is a plan view of a modified form of device with its cover partially broken away; Fig. 3 is a diagram of a modified arrangement of lamps.

Referring first to Fig. 1, I show a long tube 1, made of insulating material, preferably wood, which serves as the body or support, or containing member, of the device. At one end of this tube is a wooden cap 2, having a metal tip 7, which is to be applied to the terminal which is to be tested. Within the tube 1 are several resistances, 3, 3, 3, conveniently consisting of carbon or graphite and clay rods, preferably having a negative temperature coefficient; that is to say, having the characteristics of having their resistance become less as they become somewhat heated by the passage of the current through them. Such resistances as is well known in the art, have a high negative temperature coefficient and consequently the amount of current flowing through them increases rapidly if they are allowed to remain in circuit even though the voltage to which they are subjected is constant. These resistances are electrically connected by metal connectors 4—4. A fuse in the form of a glass tube 5, containing a fuse 6, is preferably employed and located at the forward end of the tube or sheath and extending through such end of the same, and through the metal cap 2 to the forward end of the latter, where it meets and is in contact with the metal tip 7. The fuse device is understood to be in electrical connection also with the adjacent resistance 3. At the rear end of the tube or sheath 1 are shown a set or series of lamps 8—8—8, fitted into sockets 9—9—9, which are connected in parallel with one another and in series with the resistances 3. Near the end of the sheath 1 is shown a disk 10, which can serve as a guard for the hand when using the device. The circuit conductor 11 is extended through the end of the sheath 1, and is understood to be connected with ground or to some other part of the circuit under test. The device will be used by applying the tip 7 to the terminal to be tested, and connecting the conductor 11 with ground or some other part of the circuit. If the terminal under test is charged, the lamps 8—8 will be lighted. If this occurs immediately, the potential is high, but if the lamps light up slowly the potential is comparatively low. In case of the slow lighting of the lamps, it will be seen that such lighting is due to the lowering of the resistance of the resistances 3—3 by the heating of the same to a point where enough current can pass through them to light the lamps, the potential not being sufficiently high to light the lamps immediately through the normal or cold resistance of the resistance 3. By noting the rapidity with which the lamps light up a person who is accustomed to the use of my device can readily distinguish between voltages which are considerably different from each other. For instance, the user can easily determine whether the circuit tested is of 600 volts or two thousand, or whether it is 6000 volts or 11000, and this without reference to the switching apparatus described in connection with Fig. 2, but merely by noting the rapidity with which the lamps light up and their final brilliancy.

In Fig. 2 I have shown a modified form of the device, consisting essentially of a box-like member 12, containing three resistances, 3—3—3, preferably the same as the resistances of the device of Fig. 1. These resistances are connected in series with one another by conductors 14—14. The box-like structure 12 is used where as long a device as that shown in Fig. 1 would be objectionable, the length being much reduced by the arrangement of Fig. 2. A glass fuse 5 is preferably employed in this case also, being inclosed in a tubular shaft 15 made of insulating material and secured to the box-like structure 12 and provided with a wooden cap 2, having a metal tip 7. A short insulating tube 16 is attached to the opposite side or end of the box 12, and contains the conductor 17 leading to ground. Tube 16 also serves as a handle. A series of incandescent lamps 8—8—8 are shown, mounted upon a box or case 18, having switching mechanism by which the lamps can be thrown into and out of circuit as desired. The form of switching mechanism shown comprises a sliding rod 19, having a portion of its length 19$^a$ made of insulating material, and provided with a handle 20, and the inner portion of its length 19$^b$ made of metal. This rod slides in a metal guide 21. The guide 21 is connected with the resistance 3 by a conductor 23. Contacts 25, 26, 27 are provided, and arranged to receive the rod 19 and connect with the sockets for the lamps 8—8—8. Individual connections are shown between contacts 25, 26, and 27 and the lamps 8. The other side of the lamps is connected in parallel to a conductor 24 which connects in turn with the conductor 17, which leads to ground. By sliding the rod 19 back and forth by means of its handle 20, either one or two, or all three, of the lamps 8—8—8 can be connected in circuit. This device will be used as described in connection with the device of Fig. 1, but it has the further feature of the switch for the lamps, so that by manipulating the handle 20 to cause one or more of the lamps to be lighted to normal brilliancy the potential can not only be indicated, but can be measured or computed by knowing the resistance of the device and the amount of current required to light the lamps to the point indicated.

It will be noted that by having the lamps at the end of the device near the ground conductors 11 of Fig. 1, and 17 of Fig. 2, these lamps are at a point in the circuit where they are substantially at ground potential. As a result the action of a current on them is better, there being no fluctuation or charging effect, so that their indication is more satisfactory and accurate.

In Fig. 3 I have shown a modified arrangement of lamp connection, in which the lamps are connected in parallel with one another, and also in parallel with one of the resistances 3.

It will be understood that changes and modifications can be made without departing from the spirit of the invention.

What I claim is:

1. A potential indicating and measuring instrument, comprising in combination an indicating device capable of giving a number of different indications in response to variations of current flow, and a resistance device, including carbon in its composition, said indicating device and resistance device being included in an electric circuit, whereby potential may be indicated and measured by the indicating device by permitting current to endure through the resistance device to decrease the resistance thereof.

2. A potential indicating and measuring instrument, comprising in combination an indicating device capable of giving a number of different indications in response to variations of current flow, a resistance device having a negative temperature coefficient, means for including said devices in an electric circuit, and means for varying the current in said circuit.

3. A potential indicating and measuring instrument, comprising in combination a resistance element in the form of a pencil of carbon compound having a negative temperature coefficient, an incandescent electric lamp, and means for connecting said lamp and carbon compound pencil in an electric circuit.

4. In a potential indicator in combination, a resistance, a plurality of indicating devices, means for including one or more of the indicating devices in circuit as desired, and means for including the potential indicator in a circuit to be tested.

5. A potential indicator comprising in combination, an indicating device capable of giving a number of different indications in response to variations of current flow, and a plurality of resistances connected in series with said device and with each other, said resistances having a combined negative temperature coefficient.

6. A device of the class specified, comprising resistance rods, incandescent lamps, an insulating member forming a portable holder for said lamps and rods, means by which the device can be included in a circuit to be tested, and a switch for including one or more of the lamps in circuit as desired.

7. A device of the class specified, comprising resistance rods, an insulating member forming a portable holder for said rods, a fuse, a metal cap for making connection with a terminal to be tested, and incandescent lamps mounted in sockets on said insulating member, said resistance rods, fuse, metal cap, and lamps being serially connected for purposes of testing.

8. A device of the class specified, comprising resistance rods, an insulating member forming a portable holder for said rods, a fuse, a metal cap for making connection with a terminal to be tested, incandescent lamps mounted in sockets on said insulating member, and a switch for cutting said lamps one by one into and out of circuit, said resistance rods, fuse, metal cap, and lamps being serially connected for purposes of testing.

9. A high potential indicator comprising in combination, a device capable of making a series of different indications in response to variations in current flow, and a resistance element having a high resistance in series with said device and also having a high temperature coefficient whereby the amount of current flowing through said device varies rapidly giving a series of varying indications for a given potential.

10. A device of the class specified, comprising an insulating member forming a portable holder, carbon compound rods having a negative temperature coefficient carried by said holder, a fuse in circuit with said carbon compound rods, a metal cap having a metal tip in circuit with said fuse for making connection with a circuit to be tested, and a set of lamps connected in circuit with the carbon compound rods at the end of the same opposite said metal tip.

11. A device of the character described, comprising a high resistance pencil in combination with a plurality of incandescent lamps and means for connecting one or more of said lamps in parallel relation, the lamp circuit being serially included with said resistance pencil.

12. In a potential indicator in combination, a portable case, resistance elements carried in said case, a tube inclosing a fuse projecting from said case, and a metal contact supported by said tube, said contact, fuse and resistance elements being electrically connected.

13. In a potential indicator in combination, a case supporting an indicating device, a plurality of pencil resistance elements carried side by side in said case, a tube projecting from said case inclosing a fuse, a cap carried by said tube supporting a metal contact, and means for connecting said contact, fuse, resistance elements, and indicator in circuit.

14. A potential indicator comprising in combination an indicating device capable of giving a number of different indications in response to variations of current flow, and a high resistance element formed of a carbon compound and connected in series with said device.

15. A potential indicator comprising in combination, an indicating device consisting of a plurality of incandescent electric lamps, a high resistance element formed of a carbon compound connected in series with said device, and a switch for introducing one or more of said lamps in circuit.

16. A high potential measuring instrument comprising in combination, an indicating device capable of giving a series of indications in response to different current values, and a high resistance carbon element in series with said indicating device whereby the current flowing through said device may be varied rapidly for any given potential to give a series of indications.

17. A high potential measuring instrument comprising in combination, an indicating device having means for giving a series of indications in response to variations in current flow, and a resistance element in series with said indicating device having a high resistance and also having a high temperature coefficient whereby the amount of current flowing through the instrument varies rapidly giving a series of varying indications for a given potential.

18. A high potential measuring instrument comprising in combination, an indicating device having means for giving a series of indications in response to variations in current flow, and a carbon resistance element in series with said device whereby the current flowing through said device varies rapidly on a given potential to give a series of indications.

19. A high potential indicator comprising in combination, an indicating device capable of giving a number of different indications in response to variations in current flow, and a resistance element having a high negative temperature coefficient in series with said device whereby the voltage of a line is indicated by the rapidity of change of the condition of said indicating device.

In witness whereof, I hereunto subscribe my name this 4th day of November A. D. 1908.

EDMUND O. SCHWEITZER.

Witnesses:
A. MILLER BELFIELD,
C. B. CAMPBELL.